United States Patent [19]
Etoh et al.

[11] 4,257,372
[45] Mar. 24, 1981

[54] INTERNAL COMBUSTION ENGINE EXHAUST PASSAGE STRUCTURE

[75] Inventors: Yukihiro Etoh, Yokohama; Toshiaki Tanaka, Fujisawa; Kazuya Kunii, Yokohama, all of Japan

[73] Assignee: Nissan Motor Company, Limited, Japan

[21] Appl. No.: 88,820

[22] Filed: Oct. 26, 1979

[30] Foreign Application Priority Data
Dec. 8, 1978 [JP] Japan ............................. 53-169191

[51] Int. Cl.³ ................... F02D 17/00; F02B 47/08; F01N 3/15
[52] U.S. Cl. ...................... 123/198 F; 123/568; 60/278; 60/288
[58] Field of Search ................ 123/198 F, 119 A; 60/278, 279, 288, 299

[56] References Cited
U.S. PATENT DOCUMENTS

| | | | |
|---|---|---|---|
| 4,107,921 | 8/1978 | Iizuka | 60/288 |
| 4,134,261 | 1/1979 | Iizuka et al. | 60/299 |
| 4,143,635 | 3/1979 | Iizuka et al. | 123/198 F |
| 4,201,180 | 5/1980 | Iizuka | 123/198 F |

FOREIGN PATENT DOCUMENTS

| | | | |
|---|---|---|---|
| 2900953 | 7/1979 | Fed. Rep. of Germany | 123/198 F |
| 2413547 | 12/1977 | France | 123/198 F |
| 1460475 | 1/1977 | United Kingdom | 123/198 N |
| 1482718 | 8/1977 | United Kingdom | 123/198 F |
| 1496605 | 12/1977 | United Kingdom | 123/198 F |

*Primary Examiner*—Wendell E. Burns
*Attorney, Agent, or Firm*—Lane, Aitken, Ziems, Kice & Kananan

[57] ABSTRACT

An internal combustion engine is disclosed which comprises a plurality of cylinders split into first and second groups, means responsive to engine low load conditions for cutting off flow of fuel and fresh air to the second group of cylinders, an exhaust passage provided at its downstream end with a catalyzer, a partition extending through the exhaust passage to the vicinity of the catalyzer to divide the exhaust passage into two passages, one connecting with the first group of cylinders, the other connecting with the second group of cylinders, an EGR passage bypassing the second group of cylinders for exhaust gas recirculation, and an EGR valve provided in the EGR passage and adapted to open the same in response to engine low load conditions.

1 Claim, 4 Drawing Figures

INTERNAL COMBUSTION ENGINE EXHAUST PASSAGE STRUCTURE

BACKGROUND OF THE INVENTION

1. Field of the Invention

This invention relates to a split-type internal combustion engine and, more particularly, to an exhaust passage structure for such an engine.

2. Description of the Prior Art

Split-type internal combustion engines are already well known which include a plurality of cylinders split into first and second groups, means responsive to engine low load conditions for cutting off flow of fuel and fresh air to the second group of cylinders so as to hold them suspended, and an exhaust passage provided at its downstream end with a catalyzer. For reduction of pumping loss in the suspended cylinders, exhaust gases are re-introduced into the suspended cylinders while the engine is under low load conditions. Although such split-type engines are advantageous in high fuel economy, as the amount of exhaust gases recirculated increases, the temperature of the exhaust gases passing through the catalyzer becomes too low to provide optimum performance of the catalyzer, which results in poor exhaust emission characteristics. This difficulty stems mainly from the current designs of the exhaust passage.

SUMMARY OF THE INVENTION

It is therefore one object of the present invention to provide an exhaust passage structure for use in a split-type internal combustion engine for permitting direct flow of exhaust gases discharged from operating cylinders to a catalyzer without their re-introduction into suspended cylinders so as to hold the temperature of the exhaust gases passing through the catalyzer sufficiently high to provide optimum performance of the catalyzer.

According to the present invention, this and other objects are accomplished by an internal combustion engine comprising a plurality of cylinders split into first and second groups, means responsive to engine low load conditions for cutting off flow of fuel and fresh air to the second group of cylinders, an exhaust passage provided at its downstream end with a catalyzer, a partition extending through the exhaust passage to the vicinity of the catalyzer to divide the exhaust passage into two passages, one connecting with the first group of cylinders, the other connecting with the second group of cylinders, an EGR passage bypassing the second group of cylinders for exhaust gas recirculation, and an EGR valve provided in the EGR passage and adapted to open the EGR passage in response to engine low load conditions.

Other objects, means, and advantages of the present invention will become apparent to one skilled in the art thereof from the following description.

BRIEF DESCRIPTION OF THE DRAWINGS

The following explanation of a preferred embodiment of the present invention will help in the understanding thereof, when taken in conjunction with the accompanying drawings, which, however, should not be taken as limiting the present invention in any way, but which are given for purposes of illustration only. In the drawings, like parts are denoted by like reference numbers in the several figures, and.

DESCRIPTION OF THE PREFERRED EMBODIMENT

Figure 1:
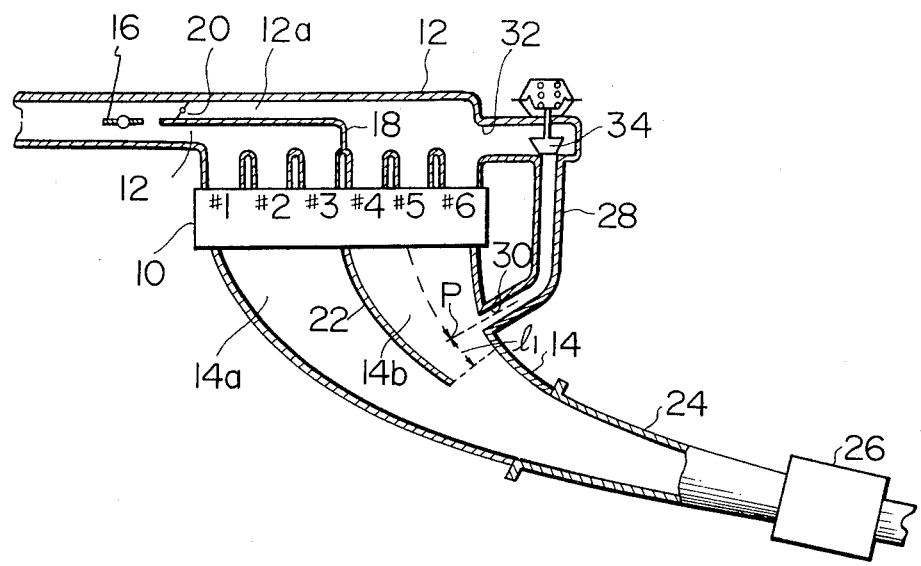
FIG. 1 is a schematic longitudinal sectional view showing a conventional split-type internal combustion engine.

Prior to the description of the preferred embodiment of the present invention, we shall briefly describe the prior art split-type internal combustion engine in FIG. 1 in order to specifically point out the difficulties attendant thereon.

Referring to FIG. 1, the conventional split-type engine includes a cylinder block 10, an intake passage 12, and an exhaust passage 14. The cylinder block 10 is formed with a first group of cylinders #1 to #3 and a second group of cylinders #4 to #6. The intake passage 12 is provided therein with a valve 16 and a partition 18 extending therethrough downstream of the valve 16 to divide it into first and second branches 12a and 12b. The first branch 12a connects with the first group of cylinders #1 to #3 and the second branch 12b connects with the second group of cylinders #4 to #6. The second branch 12b is provided at its entrance with a valve 20. The exhaust passage 14 is divided into first and second branches 14a and 14b by a partition 22 extending midway through the exhaust passage 14. The exhaust passage 14 connects at its downstream end with a front tube 24 which is provided at its downstream end with a catalyzer 26.

When the engine is under high load conditions, both of the valves 16 and 20 open to allow fresh air to enter all of the cylinders #1 to #6 so as to hold them in operation. When the engine is under low load conditions, the valve 16 opens to allow introduction of fresh air to the first group of cylinders #1 to #3 so as to hold them in operation, whereas the valve 20 closes to cut off flow of fresh air to the second group of cylinders #4 to #6 so as to hold them suspended.

An exhaust gas recirculation (EGR) passage 28 is provided which has its one end opened at 30 in the second exhaust passage branch 14b and the other end opened at 32 in the second intake passage branch 12b. The EGR passage 28 is provided therein with an EGR valve 34 which is responsive to engine high load conditions for closing the EGR passage 28 and is responsive to engine low load conditions for opening the EGR passage 28 so as to allow reintroduction of exhaust gases into the second group of cylinders #4 to #6 thereby reducing the difference between the pressures appearing at the intake and exhaust sides of the second group of cylinders #4 to #6 to reduce pumping loss in the suspended cylinders #4 to #6. The first group of cylinders #1 to #3 is bypassed by another EGR passage (not shown) for recirculation of exhaust gases thereinto.

In such a conventional split-type engine, the partition 22 is designed to have a length such that the distance l between the point P of intersection of the center lines of the second exhaust passage branch 14b and the EGR passage 28 and the center of the outlet of the second exhaust passage branch 14b has a value $l_1$ slightly longer than 25 mm. Thus, exhaust gases discharged from the first and second groups of cylinders are mixed in the exhaust passage 14 downstream of the partition 5.

Figure 2:
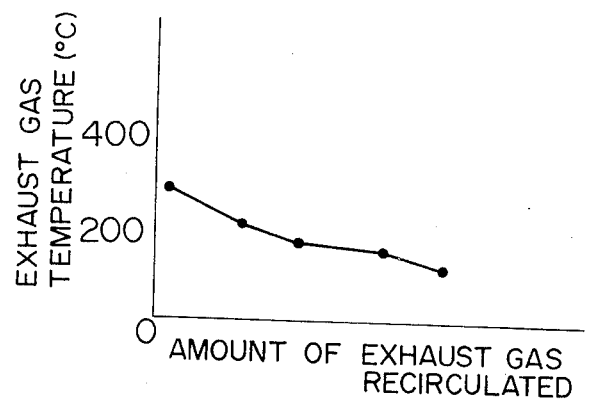
FIG. 2 is a graph showing the temperature of exhaust gases at the entrance of the catalyzer as plotted against the amount of exhaust gases recirculated.
Figure 3:
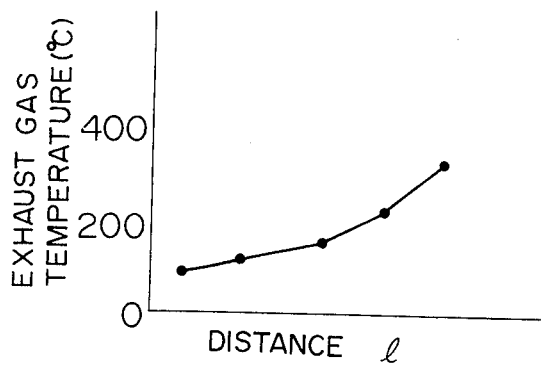
FIG. 3 is a graph plotting exhaust gas temperature appearing at the catalyzer entrance with respect to given distances l.

As can be seen in FIGS. 2 and 3, as the amount of exhaust gases recirculated into the second group of cylinders increase or the distance l decreases, the amount of exhaust gases which is discharged from the first group of cylinders and directly flow into the front tube 24 decreases so that the temperature of exhaust gases flowing through the catalyzer 26 becomes too low to provide optimum performance of the catalyzer 26.

Figure 4:
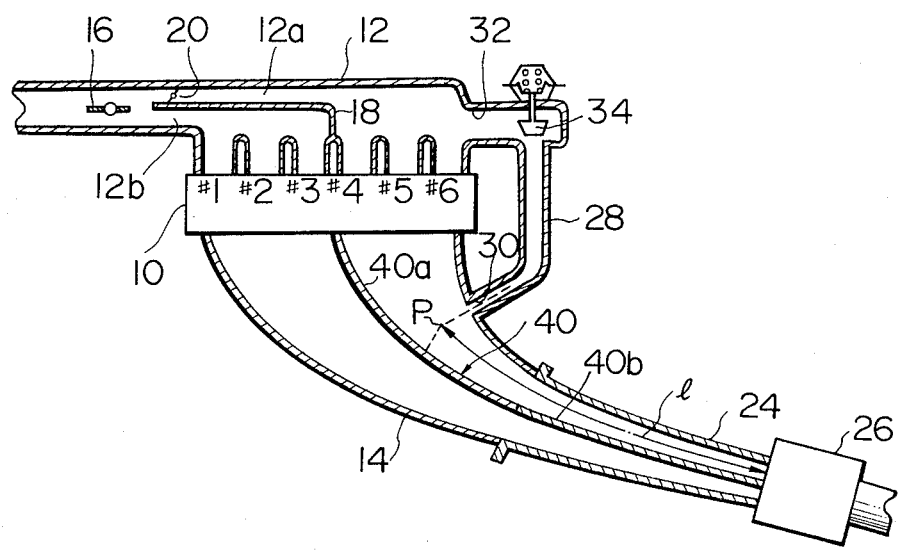
FIG. 4 is a schematic longitudinal sectional view showing a split-type internal combustion engine including an exhaust passage structure made in accordance with the present invention.

Referring now to FIG. 4, there is illustrated a split-type internal combustion engine including an exhaust passage structure made in accordance with the present invention. The exhaust passage 14 is provided therein with a partition 40a which extends the full length thereof and divides it into two passage, one connecting with the first group of cylinders #1 to #3 and the other connecting with the second group of cylinders #4 to #6. The front tube 24 is provided therein with a partition 40b which is connected with the partition 40a to form an integral partition 40 extending from the exhaust side of the cylinder block 10 to the catalyzer 26 so as to permit separate flow of exhaust gases discharged from the first and second groups of cylinders without their mixture until they reach the catalyzer 26. When the engine is under low load conditions, the valve 20 closes to cut off flow of fresh air to the second group of cylinders #4 to #6 and also valve means (not shown) closes to cut off flow of fuel to the second group of cylinders #4 to #6 so that the second group of cylinders #4 to #6 is held suspended. The EGR valve 34 is adapted to open, in response to engine low load conditions, to allow re-introduction of exhaust gases through the EGR passage 28 into the second group of cylinders #4 to #6. The exhaust gases recirculated into the second group of cylinders are only those discharged from the second group of cylinders. The exhaust gases discharged from the first group of cylinders #1 to #3 flow directly to the catalyzer 26 without flowing into the EGR passage 8. Thus, the exhaust gases passing through the catalyzer 26 are held at a temperature sufficiently high to provide optimum performance of the catalyzer 26. Although the partition 40 extends to the catalyzer 26 and only the exhaust gases discharged from the suspended cylinders are re-introduced thereinto, there is no possibility of spoiling anti-pumping-loss performance.

Although the partition 40 has been illustrated and described as extending to the catalyzer 26 in this embodiment, it is to be noted that it may have its downstream end spaced away from the catalyzer 26 as long as the distance l is sufficiently longer than the value $l_1$. That is, the amount of exhaust gases discharged from the first group of cylinders and flowing into the EGR passage 28 decreases and the exhaust gases passing through the catalyzer 26 are held at a higher temperature as the distance l increases.

It is, therefore, apparent that there has been provided, in accordance with the present invention, an exhaust passage structure for a split-type internal combustion engine for permitting the temperature of exhaust gases passing through a catalyzer to be held high so as to provide optimum performance of the catalyzer that fully satisfies the object and advantage set forth above.

What is claimed is:

1. An internal combustion engine comprising:
   (a) a plurality of cylinders split into first and second groups;
   (b) means responsive to engine low load conditions for cutting off flow of fuel and fresh air to said second group of cylinders;
   (c) an exhaust passage provided with a catalyzer;
   (d) a partition extending through said exhaust passage to the vicinity of said catalyzer to divide said exhaust passage into two passages, one connecting with said first group of cylinders, the other connecting with said second group of cylinders;
   (e) an EGR passage bypassing said second group of cylinders for exhaust gas recirculation; and
   (f) an EGR valve provided in said EGR passage and adapted to open said EGR passage in response to engine low load conditions.

* * * * *